US011979963B2

(12) United States Patent
Ok et al.

(10) Patent No.: US 11,979,963 B2
(45) Date of Patent: May 7, 2024

(54) INDUCTION-HEATING COOKING APPARATUS

(71) Applicant: LG ELECTRONICS INC., Seoul (KR)

(72) Inventors: Seungbok Ok, Seoul (KR); Byeong Wook Park, Seoul (KR); Dooyong Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 644 days.

(21) Appl. No.: 16/487,611

(22) PCT Filed: Feb. 23, 2018

(86) PCT No.: PCT/KR2018/002283
§ 371 (c)(1),
(2) Date: Aug. 21, 2019

(87) PCT Pub. No.: WO2018/159963
PCT Pub. Date: Sep. 7, 2018

(65) Prior Publication Data
US 2020/0059996 A1 Feb. 20, 2020

(30) Foreign Application Priority Data
Feb. 28, 2017 (KR) ........................ 10-2017-0026814

(51) Int. Cl.
*H05B 6/06* (2006.01)
*H05B 1/02* (2006.01)

(52) U.S. Cl.
CPC ........... *H05B 6/065* (2013.01); *H05B 1/0266* (2013.01)

(58) Field of Classification Search
CPC . H06B 6/062; H06B 6/06; H05B 6/02; H05B 6/04; H05B 6/06; H05B 6/062;
(Continued)

(56) References Cited

U.S. PATENT DOCUMENTS

2003/0155349 A1* 8/2003 Matsuo .................... H05B 6/06 219/664
2005/0247703 A1 11/2005 Ryu
(Continued)

FOREIGN PATENT DOCUMENTS

EP 2744299 A1 * 6/2014 ............. H05B 6/062
JP 2004-227839 8/2004
(Continued)

OTHER PUBLICATIONS

International Search Report (with English translation) and Written Opinion dated Jun. 18, 2018 issued in Application No. PCT/KR2018/002283.

*Primary Examiner* — Nathaniel E Wiehe
*Assistant Examiner* — Spencer H. Kirkwood
(74) *Attorney, Agent, or Firm* — KED & ASSOCIATES, LLP

(57) ABSTRACT

Disclosed herein is an induction-heating cooking apparatus that includes a sensing circuit for controlling an output of a heating coil, and more specifically, to an induction-heating cooking apparatus capable of enhancing accuracy in measuring electric currents of a heating coil by simply modifying a circuit. The induction-heating cooking apparatus includes a control unit calculating an output of a heating coil on the basis of electric currents measured by a sensor supplying alternating current power.

16 Claims, 10 Drawing Sheets

(58) Field of Classification Search
CPC ........ H05B 6/065; H05B 6/08; H05B 6/1209; H05B 6/1227; H05B 6/1236
USPC .......................................................... 219/662
See application file for complete search history.

(56) References Cited

U.S. PATENT DOCUMENTS

| | | | | |
|---|---|---|---|---|
| 2009/0129131 | A1* | 5/2009 | Hosemans | H01J 49/022 363/89 |
| 2011/0120989 | A1* | 5/2011 | Schilling | H05B 6/062 219/661 |
| 2011/0285210 | A1* | 11/2011 | Lemmens | H02J 7/007182 307/104 |
| 2014/0014647 | A1* | 1/2014 | Brosnan | H05B 6/062 219/600 |
| 2016/0178422 | A1* | 6/2016 | Humpal | A01M 7/006 239/71 |

FOREIGN PATENT DOCUMENTS

| | | | | | |
|---|---|---|---|---|---|
| JP | 2007-214143 | | | 8/2007 | |
| JP | 2007214143 | A | * | 8/2007 | |
| JP | 2008210743 | A | * | 9/2008 | |
| JP | 2013-206644 | | | 10/2013 | |
| KR | 10-2005-0103704 | | | 11/2005 | |
| KR | 10-2011-0092069 | | | 8/2011 | |
| KR | 2011009069 | A | * | 12/2011 | |
| KR | 20110092069 | A | * | 12/2011 | |
| WO | WO-2007076043 | A2 | * | 7/2007 | G01V 3/104 |

* cited by examiner

<$I_{in}$ [A] vs $I_a$ [ADC]>

<A> <B>

<$I_r$ [A] vs $I_1$ [VDC]>

INDUCTION-HEATING COOKING APPARATUS

CROSS-REFERENCE TO RELATED PATENT APPLICATIONS

This application is a U.S. National Stage Application under 35 U.S.C. § 371 of PCT Application No. PCT/KR2018/002283, filed Feb. 23, 2018, which claims priority to Korean Patent Application No. 10-2017-0026814, filed Feb. 28, 2017, whose entire disclosures are hereby incorporated by reference.

TECHNICAL FIELD

The present disclosure relates to an induction-heating cooking apparatus that includes a sensing circuit for controlling an output of a heating coil, and more specifically, to an induction-heating cooking apparatus capable of enhancing accuracy in measuring electric currents of a heating coil by simply modifying a circuit.

BACKGROUND

In general, an induction-heating cooking apparatus is an electric cooking device that cooks food with the method in which high-frequency currents flow through a working coil or a heating coil, and when a strong magnetic line of force, generated as a result, passes through a cooking container, eddy currents flow such that the container itself is heated.

According to a basic theory of heating of the induction-heating cooking apparatus, as electric currents are supplied to a heating coil, a cooking container that is a magnetic substance generates heat through induction heating, and the cooking container itself is heated by the generated heat to cook food.

The configuration of a circuit of a conventional induction-heating cooking apparatus is described as follows with reference to FIG. 1.

A driving circuit 10 used for an induction-heating electric cooking apparatus switches voltages that are supplied to a heating coil (Coil) such that high-frequency currents flow through the heating coil (Coil). The driving circuit 10 drives a switch unit 7 comprised of usual insulate gate bipolar transistors (IGBT) such that high-frequency currents flow through the heating coil and a high-frequency magnetic field is formed in the heating coil (Coil).

Specifically, the driving circuit 10 of the induction-heating electric cooking apparatus includes an alternating-current-power supplying unit 1 that is supplied with usual alternating current power, a rectifying unit 2 that rectifies the alternating current power, a filter 3 that filters the power rectified by the rectifying unit 2, and a switch unit 7 that is supplied with the power filtered by the filter 3, that drives switching devices and that supplies high-output power to a heating coil.

A sensor 20 is connected with the alternating-current-power supplying unit 1 and senses voltages or electric currents output from the alternating-current-power supplying unit 1. A control unit 30 calculates voltages or electric currents supplied to the heating coil (Coil) on the basis of voltages or electric currents measured by the sensor 20, and generates control signals for controlling operations of a switch driving unit 40 on the basis of the calculated voltages or electric currents. The switch driving unit 40 controls on/off operations of the switch unit 7 on the basis of the control signals received from the control unit 30.

In this case, electric currents flowing through the heating coil (Coil) have to be accurately sensed to precisely control an output of the heating coil (Coil). However, in a conventional sensing method, calculation of an output of a heating coil (Coil) lacks accuracy. Additionally, the convention sensing method is not appropriate to sense voltages or electric currents of a plurality of heating coils.

Further, a method of directly measuring electric currents or voltages flowing through a heating coil (Coil) at a node in which the heating coil (Coil) is placed may be used. However, with the method, constituting a circuit incurs huge costs.

DISCLOSURE

Technical Problems

The objective of the present disclosure is to provide an induction-heating cooking apparatus that may enhance accuracy in controlling an output of a heating coil by exactly sensing the output of the heating coil with a simple change in the structure of a circuit at low costs.

Another objective of the present disclosure is to provide an induction-heating cooking apparatus that may enhance accuracy in measuring outputs of a plurality of heating coils by exactly sensing the outputs of the plurality of heating coils with a simple change in the structure of a circuit at low costs.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

Technical Solutions

An induction-heating cooking apparatus according to an embodiment includes a power supplying unit that supplies alternating current power, a rectifying unit that rectifies the alternating current power supplied by the power supplying unit, a filter that filters the power rectified by the rectifying unit, a first driving unit that includes a first switch unit supplying the power filtered by the filter to a first heating coil, and first sensing resistance disposed between the filter and the first switch unit, a sensor that measures electric currents flowing through the first sensing resistance, and a control unit that calculates an output of the first heating coil on the basis of the electric currents measured by the sensor.

An induction-heating cooking apparatus according to another embodiment includes a power supplying unit that supplies alternating current power, a rectifying unit that rectifies the alternating current power supplied by the power supplying unit, a filter that filters the power rectified by the rectifying unit, a first driving unit that supplies the filtered power to a first heating coil, wherein the first driving unit includes a first capacitor connected between one side of the first heating coil and one side of the filter, a second capacitor connected between one side of the first heating coil and the other side of the filter, a first switch connected between the other side of the first heating coil and one side of the first capacitor, a second switch connected between the other side of the first heating coil and one side of the second capacitor, and first sensing resistance connected between the other side of the filter and one side of the second capacitor.

Advantageous Effects

The induction-heating cooking apparatus according to the present disclosure includes a circuit structure in which sensing resistance is added between a filter and a switch unit and electric currents flowing through the sensing resistance is measured, thereby making a circuit smaller than a circuit using a resonance CT sensor and reducing manufacturing costs. Additionally, electric currents flowing through sensing resistance and an output of a heating coil have linearity. Accordingly, the output of a heating coil may be accurately sensed by measuring electric currents flowing through the sensing resistance. By doing so, a sensing circuit that ensures high credibility and high efficiency in controlling a high-output induction may be implemented at a low cost.

Further, the induction-heating cooking apparatus according to the present disclosure includes a circuit structure in which sensing resistance is added to each of the plurality of heating coils and electric currents flowing through the sensing resistance is measured. Accordingly, outputs of the plurality of heating coils may be accurately sensed. By doing so, the outputs of the plurality of heating coils may be controlled accurately and independently, and a circuit required for sensing outputs of the plurality of heating coils may be simplified. Thus, the induction-heating cooking apparatus according to the present disclosure may enhance user convenience and reduce costs.

BEST MODE

Figure 1:
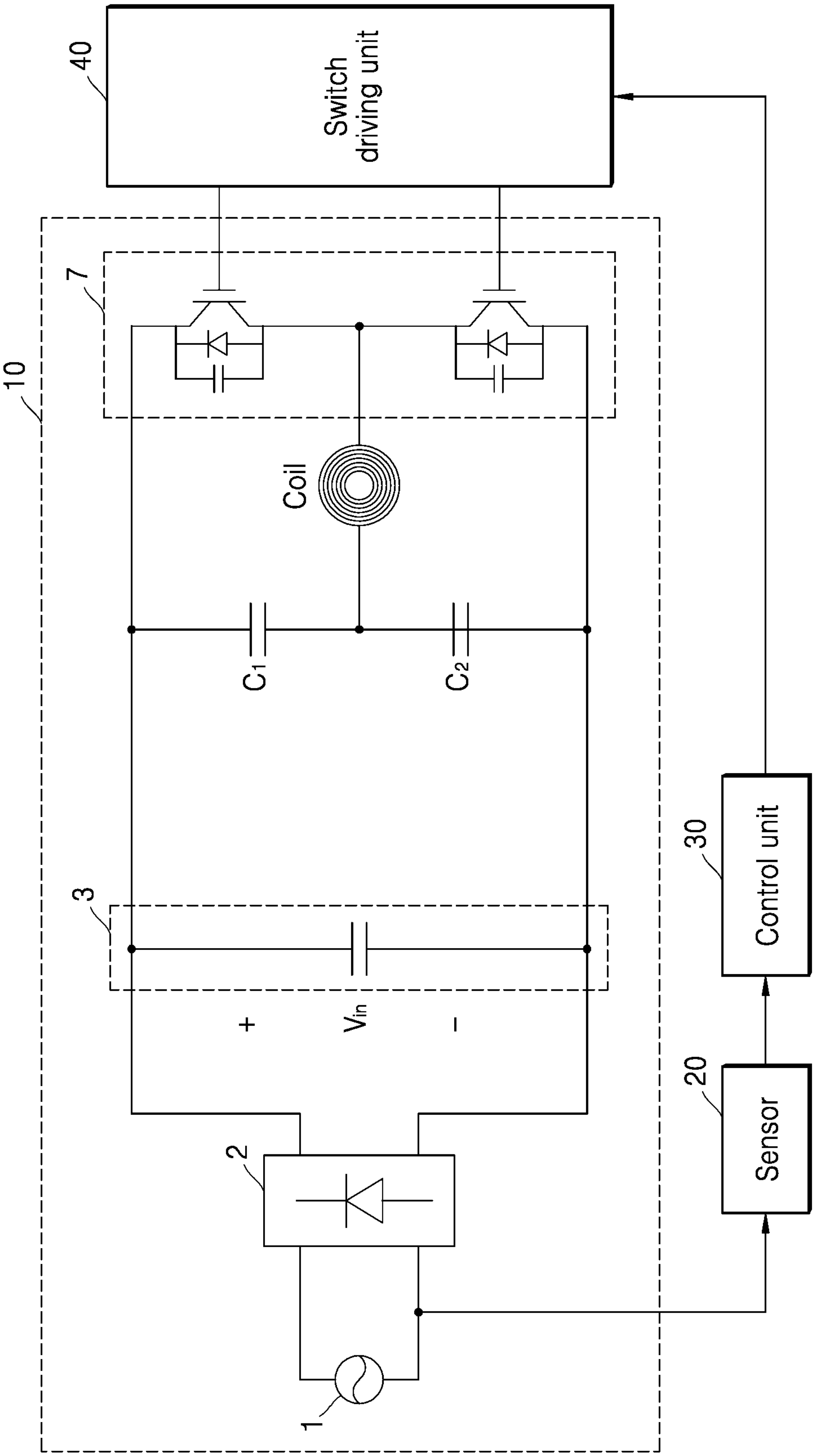
FIG. 1 is a block diagram illustrating a configuration of a circuit of a conventional induction-heating cooking apparatus.

Terms and words used in this specification and the appended claims should not be interpreted as those defined in commonly used dictionaries. The terms and words should be interpreted on the basis of the meaning and concept in accordance with the technical spirit of the present invention according to the principle that the inventor can properly define the concept of terms so as to best describe the invention. The embodiments set forth in this specification, and the elements illustrated in the drawings are presented only as preferred embodiments and do not represent the technical spirit of the present invention entirely. It should be understood that there may be various equivalents and modifications capable of replacing the embodiments and elements at the time when this application is filed.

Below, an induction-heating cooking apparatus according to embodiments is described with reference to the attached drawings.

Figure 2:
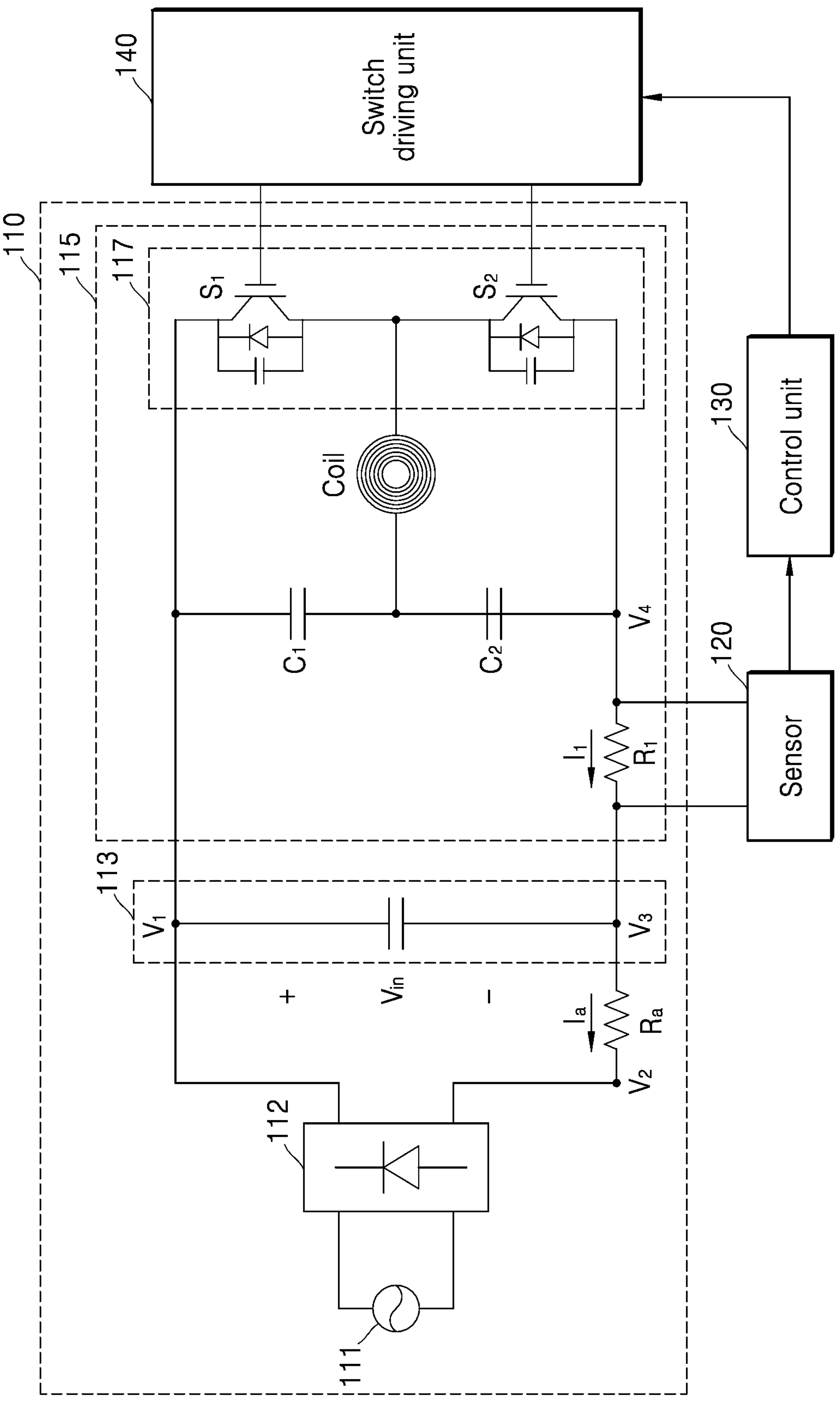
FIG. 2 is a block diagram illustrating a configuration of a circuit of an induction-heating cooking apparatus according to some embodiments.

FIG. 2 is a block diagram illustrating a configuration of a circuit of an induction-heating cooking apparatus according to some embodiments.

Referring to FIG. 2, an induction-heating cooking apparatus according to some embodiments includes a driving circuit 110 that drives a heating coil (Coil), a sensor 120, a control unit 130, and a switch driving unit 140.

The driving circuit 110 supplies high-frequency power to the heating coil (Coil). As electric currents are supplied to the heating coil (Coil), a cooking container on the heating coil (Coil) that is a magnetic substance generates heat by induction heating, and by the generated heat, the cooking container itself is heated. Thus, food is cooked.

The heating coil (Coil) may include a dual heating coil that is separated into and comprised of an inner coil and an outer coil, and a single heating coil. However, the present disclosure is not limited to what has been described.

Specifically, the driving circuit 110 includes an alternating-current-power supplying unit 111, a rectifying unit 112, a filter 113 and a driving unit 115.

The alternating-current-power supplying unit 111 supplies usual alternating current power.

The rectifying unit 112 may rectify alternating current power supplied by the alternating-current-power supplying unit 111. The rectifying unit 112 may include at least one or more diodes, but the present disclosure is not limited to what has been described.

The filter 113 may filer the power rectified by the rectifying unit 112. The filter 113 may include at least one capacitor, but the present disclosure is not limited to what has been described. The filter 113 may supply an input voltage (Vin) to the driving unit 115.

The driving unit 115 supplies power to the heating coil (Coil). The driving unit 115 includes sensing resistance (R1), a switch unit 117 including a plurality of switching devices (S1, and S2), and a plurality of capacitors (C1, and C2). The driving unit 115 operates as an inverter that controls operations of the heating coil (Coil).

Specifically, the driving unit 115 is connected with an output terminal of the filter 113, and includes first and second switching devices (S1, and S2) that are connected in series, and first and second capacitors (C1, and C2) that are connected in parallel respectively with the first and second switching devices (S1, and S2). The first and second switching devices (S1, and S2) may include an insulated gate bipolar transistor (IGBT), but the present disclosure is not limited to what has been described.

The induction-heating cooking apparatus that is configured as described above receives alternating current power, rectifies and smoothes the input alternating current power, and supplies direct current power to the driving unit 115. In this case, high-frequency currents flow through the heating coil (Coil) by increasing the speed at which the first and second switching devices (S1, and S2) of the driving unit 115 alternately operate, thereby generating a high-frequency magnetic flux.

In this case, the first and second capacitors (C1, and C2), connected in parallel respectively with the first and second switching devices (S1, and S2), may reduce switching losses that are generated when the first and second switching devices (S1, and S2) perform switching operations.

Additionally, the driving unit 115 includes sensing resistance (R1). First sensing resistance (R1) may be connected between one end of the filter 113 and one end of the second capacitor (C2).

The sensor 120 may measure electric currents flowing through the sensing resistance (R1). However, the present disclosure is not limited to what has been described, and the sensor 120 may measure voltages and electric currents of both ends of the sensing resistance (R1). The sensor 120 may deliver measured data to the control unit 130.

The control unit 130 may calculate an output of the heating coil (Coil) on the basis of the data measured by the sensor 120. A method of calculating an output of the heating coil (Coil) on the basis of data measured by the sensor 120 is specifically described with reference to FIGS. 4 to 9 hereunder.

The control unit 130 may deliver control signals to the switch driving unit 140 on the basis of the calculated output of the heating coil (Coil). Though not explicitly illustrated in the drawing, the control unit 130 may generate control signals to adjust an output of the heating coil (Coil) according to a value that is input by a user or that is previously input. The generated control signals are delivered to the switch driving unit 140.

The switch driving unit 140 may control operations of the first and second switching devices (S1, and S2) on the basis of the control signals received from the control unit 130.

Additionally, the driving circuit 110 of the induction-heating cooking apparatus of the present disclosure may further include a third sensing resistance (Ra). Though not explicitly illustrated in the drawing, the sensor 120 may measure electric currents flowing through the third sensing resistance (Ra) or voltages of both ends of the third sensing resistance (Ra). The sensor 120 supplies measured data to the control unit 130, and the control unit 130 may calculate input currents and voltages on the basis of the received data. However, the present disclosure is not limited to what has been described.

Figure 3:
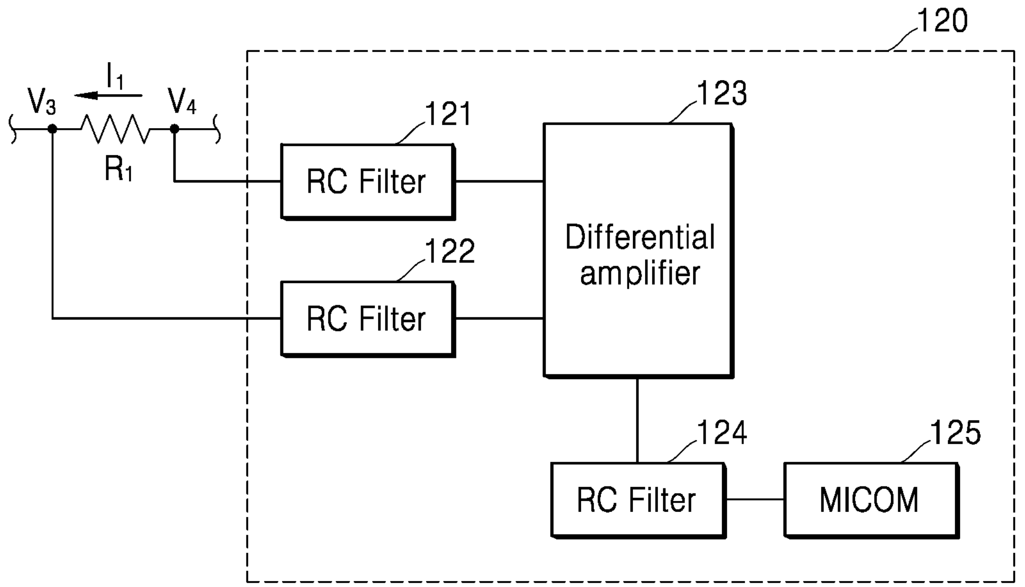
FIG. 3 is a block diagram illustrating a configuration of a circuit of the sensor in FIG. 2.

FIG. 3 is a block diagram illustrating a configuration of a circuit of the sensor in FIG. 2.

Referring to FIG. 3, the sensor 120 included in the induction-heating cooking apparatus according to some embodiments includes a differential amplifier 123, an RC filter 124, and a micom 125.

The differential amplifier 123 may receive electric currents flowing through both ends of the sensing resistance (R1 or Ra), or voltages at both ends of the sensing resistance (R1 or Ra), and may compare and amplify signals received at both of the ends.

The RC filter 124 receives an output of the differential amplifier 123. The RC filter 124 may remove noise ingredients included in a value received from the differential amplifier 123.

The micom (or processor) 125 may receive signal values from which noise ingredients are removed from the RC filter 124, and may measure values of electric currents or voltages flowing through the sensing resistance (R1) on the basis of the signal values.

In this case, values of electric currents or voltages flowing through the sensing resistance (R1) may be expressed as ADC. For example, when a 5V voltage is supplied to both ends of the sensing resistance (R1), value of ADC may be 1024, and when a 1V voltage is supplied to both ends of the sensing resistance (R1), value of ADC may be 100, and when a 0V voltage is supplied to both ends of the sensing resistance (R1), value of ADC may be 0. However, the present disclosure is not limited to what has been described.

Data measured by the sensor 120 may be delivered to the control unit 130. Though not explicitly illustrated in the drawing, the sensor 120 of the present disclosure may measure voltages at both ends of both sensing resistances (Ra and R1), and electric currents flowing through both ends of the sensing resistances (Ra and R1).

Additionally, the sensor 120 included in the induction-heating cooking apparatus according to a few different embodiments may include RC filters 121, 122 that are respectively disposed at input terminals of the differential amplifier 123. The RC filters 121, 122 may extract high-frequency ingredients of signals input to the differential amplifier 123, or may extract the largest value among values of input signals and may deliver the largest value to the differential amplifier 123. However, the present disclosure is not limited to what has been described.

FIGS. 4 to 9 are views for explaining operations of an induction-heating cooking apparatus according to some embodiments.

Figure 4:
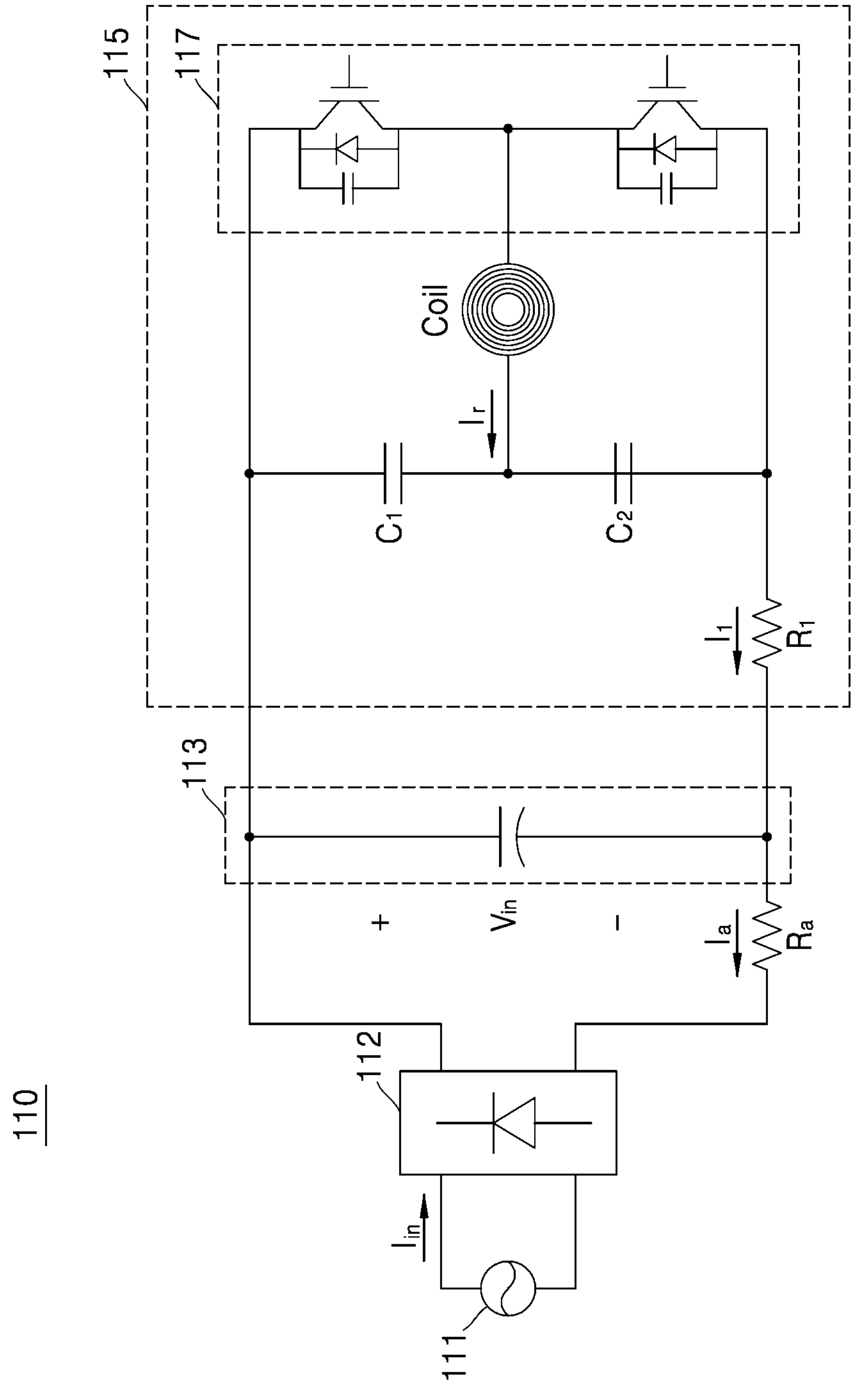
FIGS. 4 to 9 are views for explaining operations of an induction-heating cooking apparatus according to some embodiments.
Figure 5:
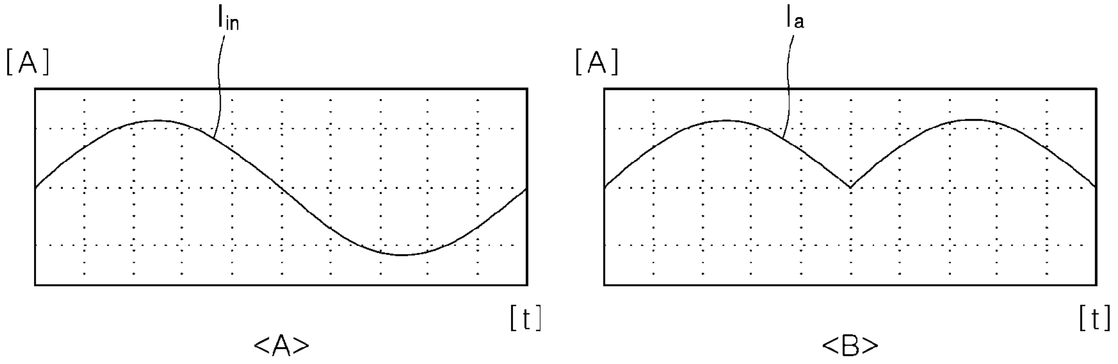
Figure 6:
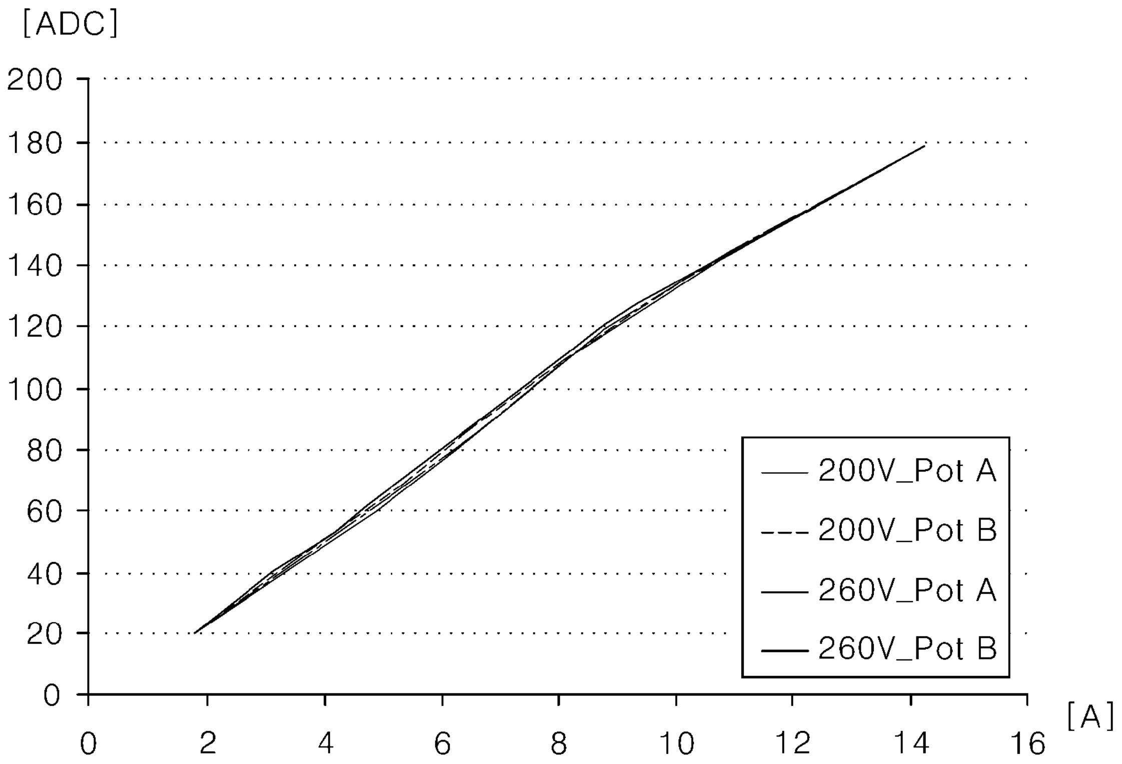

Referring to FIGS. 4 to 6, FIGS. 4 to 6 illustrate input currents (Iin) supplied by the power supplying unit 111, and primary currents (Ia) flowing through the third sensing resistance (Ra).

Specifically, the primary currents (Ia) are half-wave rectified waveforms of the input currents (Iin). The input currents (Iin) are rectified while passing through the rectifying unit 112, and as a result, have the same waveform as the primary currents (Ia).

In this case, RMS values of the input currents (Iin) and the primary currents (Ia) are the same, and the primary currents (Ia) may be substituted for the input currents (Iin).

FIG. 6 is a graph showing results of experimenting on linearity between the input currents (Iin) and the primary currents (Ia) under different conditions. As a result of calculating a relationship between the input currents (Iin) and the primary currents (Ia) with different containers (pot A and pot B) on the heating coil (Coil) when input voltages (Vin) are respectively 200V and 260V, linearity between the input currents (Iin) and the primary currents (Ia) was established.

By doing so, the control unit 130 may accurately calculate the input currents (Iin) by measuring the primary currents (Ia) through the sensor 120.

Figure 7:
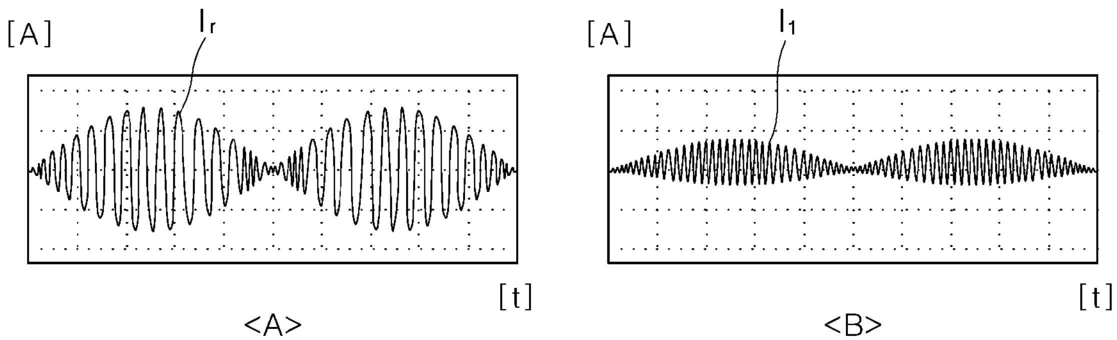
Figure 8:
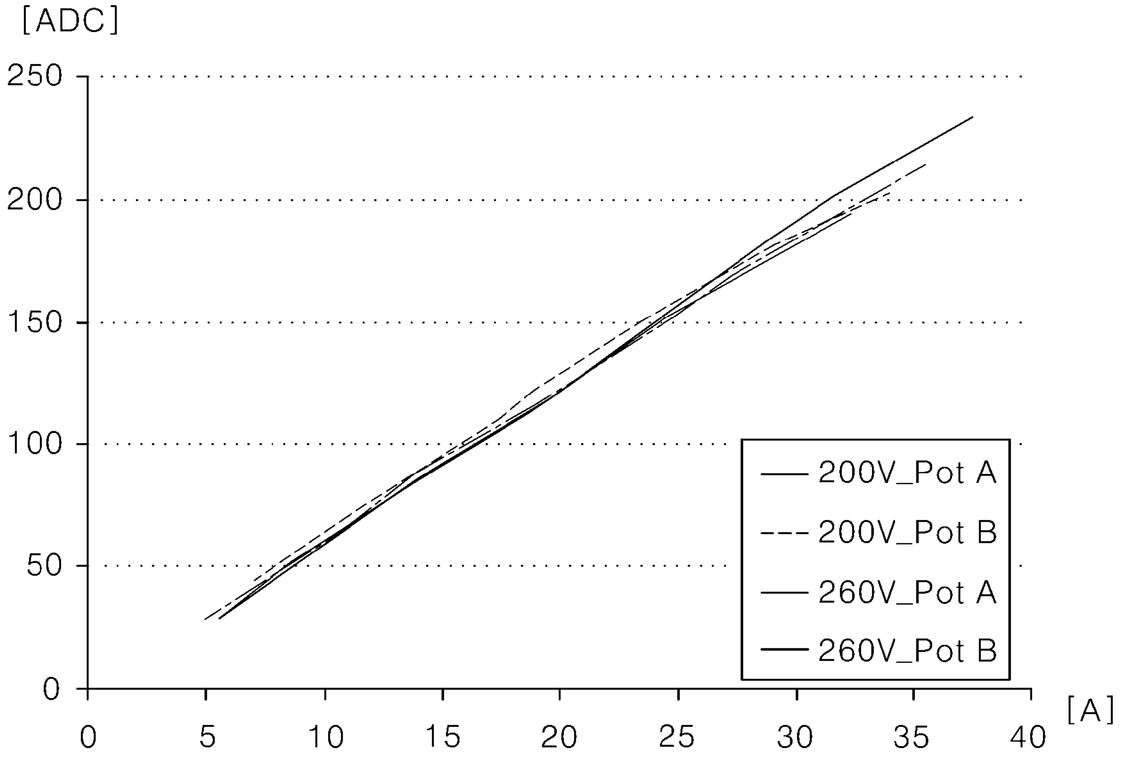
Figure 9:
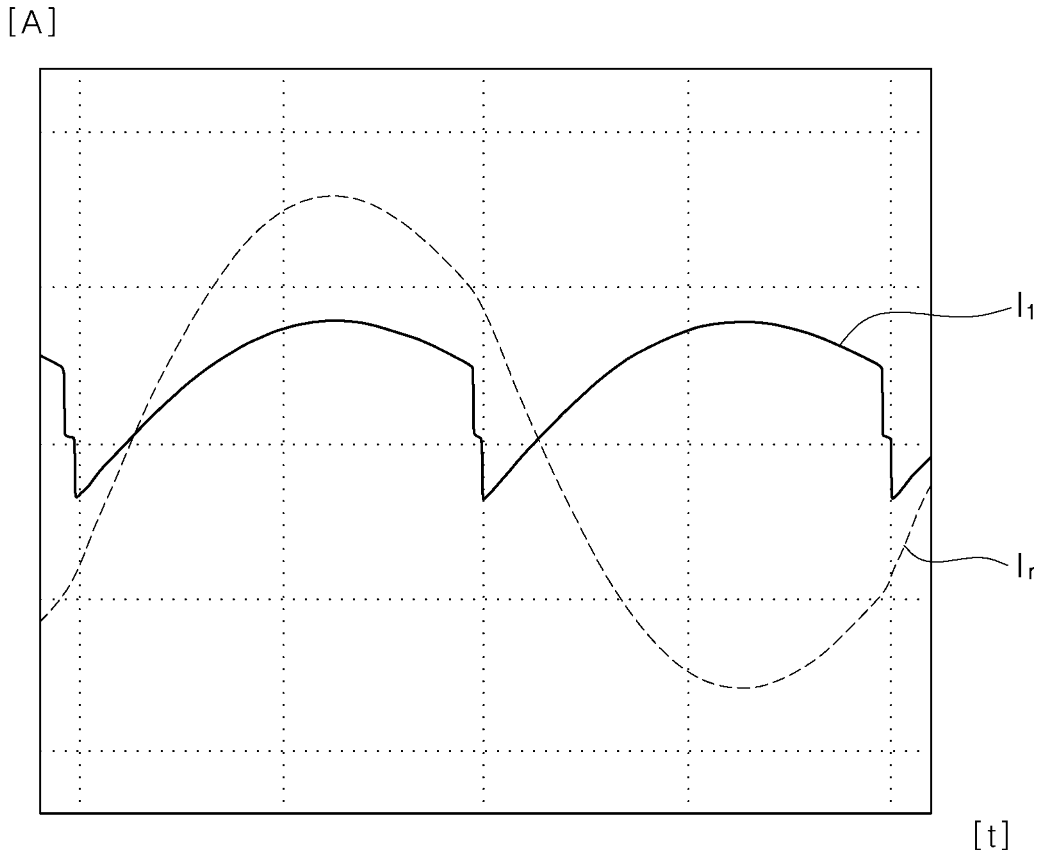

Referring to FIGS. 7 to 9, FIGS. 7 to 9 illustrate secondary currents (I1) flowing through the sensing resistance (R1) and resonance currents (Ir) flowing through the heating coil (Coil).

Specifically, a peak value of the secondary currents (I1) is half the peak value of the resonance currents (Ir), and frequencies of the secondary currents (I1) are two times as much as frequencies of the resonance currents (Ir). That is, the secondary currents (I1) and the resonance currents (Ir) have linearity, and the secondary currents (I1) include peak current information on a resonance load of the heating coil (Coil).

Thus, when a peak value of the secondary currents (I1) is learned, a peak value and an RMS value of the resonance currents (Ir) may be calculated. That is, the secondary currents (I1) may be substituted for the resonance currents (Ir).

Accordingly, the sensor 120 measures magnitude of the secondary currents (I1), and delivers the measured value of the secondary currents (I1) to the control unit 130. Next, the control unit 130 may calculate resonance currents (Ir) using the received data of the secondary currents (I1), and on the basis of the calculated resonance currents, may calculate an output of the heating coil (Coil).

FIG. 8 is a graph showing results of experimenting on linearity between the secondary currents (I1) and the resonance currents (Ir) under different conditions. As a result of calculating a relationship between the secondary currents (I1) and the resonance currents (Ir) with different containers (pot A and pot B) on the heating coil (Coil) when input voltages (Vin) are respectively 200V and 260V, linearity between the input currents (Iin) and the primary currents (Ia) was established.

By doing so, the control unit 130 may accurately calculate the resonance currents (Ir) by measuring the secondary currents (I1) through the sensor 120.

That is, the induction-heating cooking apparatus of the present disclosure may accurately sense an output of the heating coil by measuring electric currents flowing through the sensing resistance. By doing so, a sensing circuit that ensures high credibility and high efficiency in controlling a high-output induction may be implemented at a low cost.

The size and the manufacturing costs of the sensing circuit of the induction-heating cooking apparatus according to the present disclosure may be smaller and lower than those of a circuit of an induction-heating cooking apparatus to which a conventional method for measuring resonance currents using a resonance CT sensor is applied.

Figure 10:
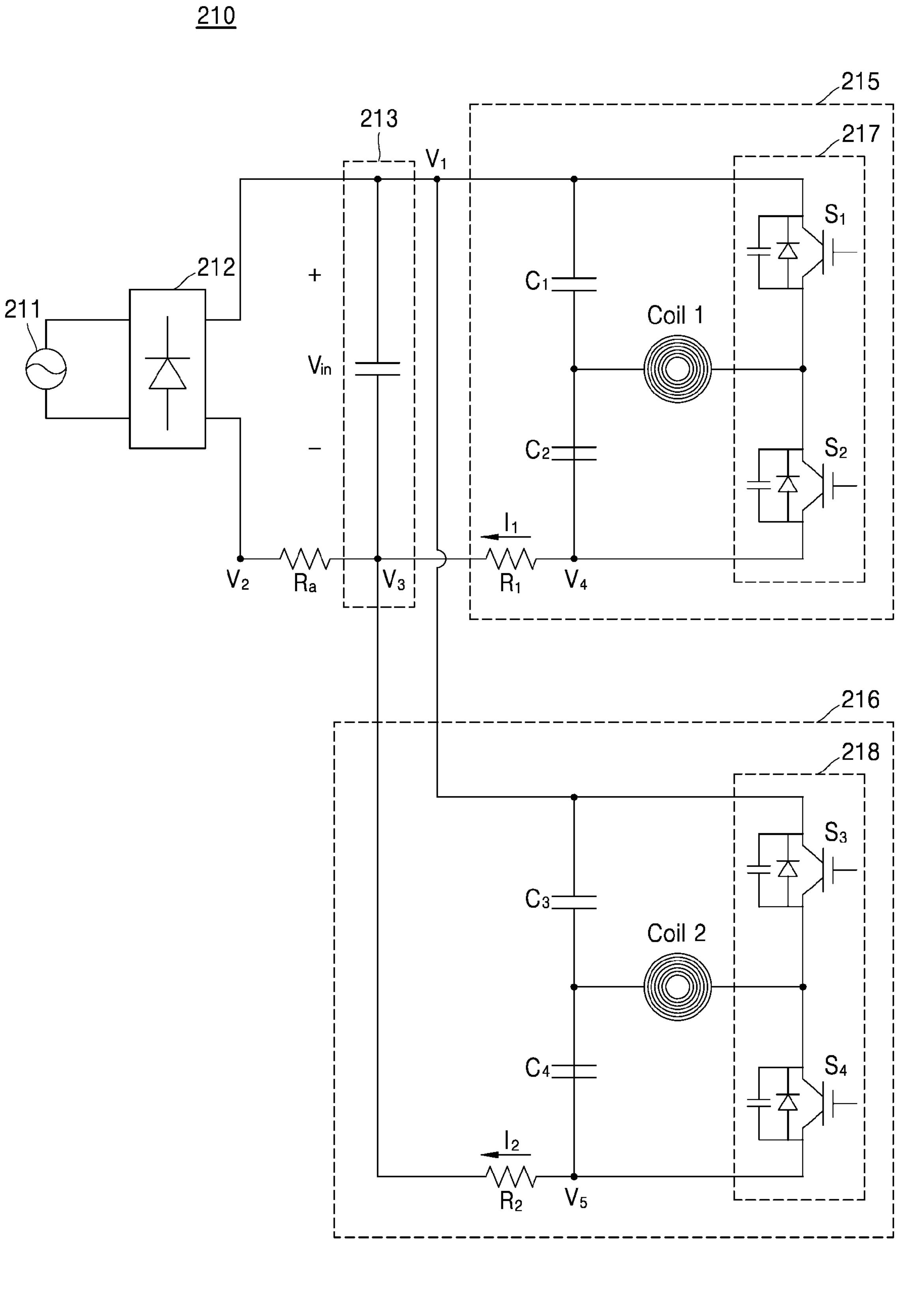
FIG. 10 is a block diagram illustrating a configuration of a circuit of an induction-heating cooking apparatus according to a few different embodiments.

FIG. 10 is a block diagram illustrating a configuration of a circuit of an induction-heating cooking apparatus according to a few different embodiments.

For convenience of description, details identical with those of the above-described embodiments are not described, but differences are described.

Referring to FIG. 10, the induction-heating cooking apparatus according to a few different embodiments includes a driving circuit 210, a sensor, a control unit and a switch driving unit. Though not explicitly illustrated in the drawing, the sensor, the control unit, and the switch driving unit operate in a way substantially the same as the sensor 120, the control unit 130, and the switch driving unit 140 that are described above with reference to FIG. 2. Accordingly, they are omitted in the drawing.

The driving circuit 210 of the present disclosure includes an alternating-current-power supplying unit 211, a rectifying unit 212, a filter 213, a first driving unit 215 and a second driving unit 216. The first driving unit 215 includes a circuit substantially the same as the circuit of the driving unit 115 that is described above with reference to FIG. 2.

The second driving unit 216 includes components substantially the same as those of the first driving unit 215 and may operate in a way substantially the same as the first driving unit 215.

Specifically, the first driving unit 215 includes first sensing resistance (R1), a first switch unit 217 including a plurality of switching devices (S1, and S2), and a plurality of capacitors (C1, and C2). The first driving unit 215 operates as a first inverter that controls operations of a first heating coil (Coil 1).

Likewise, the second driving unit 216 includes second sensing resistance (R2), a second switch unit 218 including a plurality of switches (S3, and S4), and a plurality of capacitors (C3, and C4). The second driving unit 216 operates as a second inverter that controls operations of a second heating coil (Coil 2).

In this case, the second driving unit 216 may be connected in parallel with the first driving unit 215.

The sensor may measure electric currents flowing through the first sensing resistance (R1) and the second sensing resistance (R2). However, the present disclosure is not limited to what has been described, and the sensor may measure voltages and electric currents of both ends of the first sensing resistance (R1) and the second sensing resistance (R2). The control unit may calculate outputs of the first heating coil (Coil 1) and the second heating coil (Coil 2) respectively on the basis of data measured by the sensor. A method of calculating outputs of the first heating coil (Coil 1) and the second heating coil (Coil 2) may be the same as the method that is described above with reference to FIGS. 4 to 9.

By doing so, the induction-heating cooking apparatus according to the present disclosure may accurately sense outputs of a plurality of heating coils by measuring electric currents flowing through sensing resistance corresponding to each of the plurality of heating coils. Accordingly, outputs of the plurality of heating coils may be controlled accurately and independently, and a circuit required for sensing the outputs of the plurality of heating coils may be simplified, thereby enhancing user convenience and reducing costs.

The embodiments are provided as examples only to describe the invention and are not intended to limit the present disclosure. The scope of the present disclosure should be defined according to the appended claims rather than the detailed description set forth herein. Further, the meaning and scope of the appended claims and various modifications and equivalents thereof should be construed as being included within the technical spirit of the present disclosure.

| Description of the Symbols | |
|---|---|
| 110: Driving circuit | 111: Power supplying unit |
| 112: Rectifying unit | 113: Filter |
| 115: Driving unit | 120: Sensor |
| 130: Control unit | 140: Switch driving unit |

The invention claimed is:

1. An induction-heating cooking apparatus, comprising:

a power supply configured to supply alternating current power;

a rectifier configured to rectify the alternating current power supplied by the power supply;

a filter configured to filter the power rectified by the rectifier;

a first driving circuit configured to supply the filtered power to a first heating coil, the first driving circuit including:

a first capacitor connected between a first end of the first heating coil and a first terminal of the filter;

a second capacitor connected between the first end of the first heating coil and a second terminal of the filter;

a first switch connected between a second end of the first heating coil and the first capacitor;

a second switch connected between the second end of the first heating coil and the second capacitor; and a first resistor connected in series with and between the second terminal of the filter and the second capacitor;

a sensor configured to measure a first voltage drop between the second capacitor and the second terminal of the filter and first electric currents flowing through the first resistor; and a controller configured to calculate an output of the first heating coil based on the first voltage drop and the first electric currents measured by the sensor, wherein the sensor includes:

a differential amplifier connected ends of the first resistor and configured to compare and amplify respective signals received from the ends of the first resistor, a first resistor-capacitor (RC) filter configured to remove high-frequency components of an output of the differential amplifier; and a processor configured to receive an output of the first RC filter and to calculate the electric currents flowing through the first resistor, wherein a first one of the first and second switches is connected between a second end of the first heating coil and the first capacitor, a second one of the first and second switches is connected between the second end of first heating coil and the second capacitor, and the first resistor is connected between the second terminal of the filter and of the second capacitor, wherein the sensor further includes a third resistor-capacitor (RC) filter provided between another one of the ends of the first resistor and the differential amplifier, and configured to remove input noise components, and wherein the first resistor includes a first end directly connected to the second capacitor, and a second end directly connected the second terminal of the filter.

2. The induction-heating cooking apparatus of claim 1, further comprising a second driving circuit including secondary switches that are selectively activated to regulate a supply of the power filtered by the filter to a second heating coil different from the first heating coil, and a second resistor provided between the filter and the secondary switches, wherein:

the sensor is configured to measure a second voltage drop across the second resistor and second electric currents flowing through the second resistor, and the controller is further configured to calculate an output of the second heating coil based on the second voltage drop and the second electric currents measured by the sensor.

3. The induction-heating cooking apparatus of claim 1, wherein the induction-heating cooking apparatus further comprises a another resistor provided between the rectifier and the filter, and the sensor is configured to measure a third voltage drop between the rectifier and the filter, and third electric currents flowing through the other resistor and to provide an indication of third voltage drop and the third electric currents to the controller.

4. The induction-heating cooking apparatus of claim 1, wherein the sensor further includes a second resistor-capacitor (RC) filter provided between one of the ends of the first resistor and the differential amplifier, and configured to remove input noise components.

5. The induction-heating cooking apparatus of claim 1, further comprising:

a second driving circuit configured to supply the filtered power to a second heating coil different from the first heating coil, the second driving circuit including:

a third capacitor connected between a first end of the second heating coil and the first terminal of the filter;

a fourth capacitor connected between the first end of the second heating coil and the second terminal of the filter;

a third switch connected between a second end of the second heating coil and the third capacitor;

a fourth switch connected between the second end of the second heating coil and the fourth capacitor; and a second resistor connected in series with and between the second terminal of the filter and the fourth capacitor.

6. The induction-heating cooking apparatus of claim 1, further comprising:

a switch driving circuit that selectively provides driving signals to the first and second switches based on control signals received from the controller.

7. The induction-heating cooking apparatus of claim 1, further comprising:

a switch driving circuit that selectively provides driving signals to the first and second switches based on control signals received from the controller.

8. The induction-heating cooking apparatus of claim 2, wherein the first driving circuit and the second driving circuit are connected in parallel to the first terminal of the filter.

9. The induction-heating cooking apparatus of claim 2, wherein the second driving circuit further includes:

a third capacitor connected between a first end of the second heating coil and the first terminal of the filter; and a fourth capacitor connected between the first end of the second heating coil and the second terminal of the filter.

10. The induction-heating cooking apparatus of claim 3, wherein the controller is configured to calculate input currents associated with the alternating current power supplied by the power supply based on the third electric currents flowing through the other resistor.

11. The induction-heating cooking apparatus of claim 5, wherein the first driving circuit and the second driving circuit are connected in parallel to the second terminal of the filter.

12. The induction-heating cooking apparatus of claim 5, wherein:

the sensor is configured to measure electric currents flowing through the second resistor; and the controller is configured to calculate outputs of the second heating coil based on the electric currents flowing through the second resistor.

13. The induction-heating cooking apparatus of claim 12, wherein the sensor includes:

a differential amplifier connected to both ends of the first resistor and configured to compare and amplify signals received from the ends of the first resistor;

a first resistor-capacitor (RC) filter configured to remove high-frequency components of an output of the differential amplifier; and a processor configured to receive an output of the first RC filter and to calculate the electric currents flowing through the first resistor.

14. The induction-heating cooking apparatus of claim 12, wherein the induction-heating cooking apparatus further comprises:

another sensing resistor provided between the rectifier and the filter, wherein the sensor is further configured to measure electric currents flowing through the other sensing resistor and to supply information associated with the electric currents flowing through the other sensing resistor to the controller.

15. The induction-heating cooking apparatus of claim 13, wherein the sensor further includes a second RC filter positioned between one end of the first sensing resistor and the differential amplifier, and configured to remove input noise components.

16. The induction-heating cooking apparatus of claim 9, wherein:

a first one of the secondary switches is connected between a second end of the second heating coil and the third capacitor, a second one of the secondary switches is connected between the second end of the second heating coil and the fourth capacitor, and the second resistor is connected between the second terminal of the filter and the fourth capacitor.

* * * * *